May 30, 1939. J. CANETTA ET AL 2,160,211
VARIABLE LOAD BRAKE
Filed April 27, 1937 3 Sheets-Sheet 1

INVENTORS
JOHN CANETTA
JOHN B. GROSSWEGE
BY Wm. M. Cady
ATTORNEY

May 30, 1939. J. CANETTA ET AL 2,160,211
VARIABLE LOAD BRAKE
Filed April 27, 1937 3 Sheets-Sheet 2

INVENTORS
JOHN CANETTA
JOHN B. GROSSWEGE
BY Wm. M. Cady
ATTORNEY

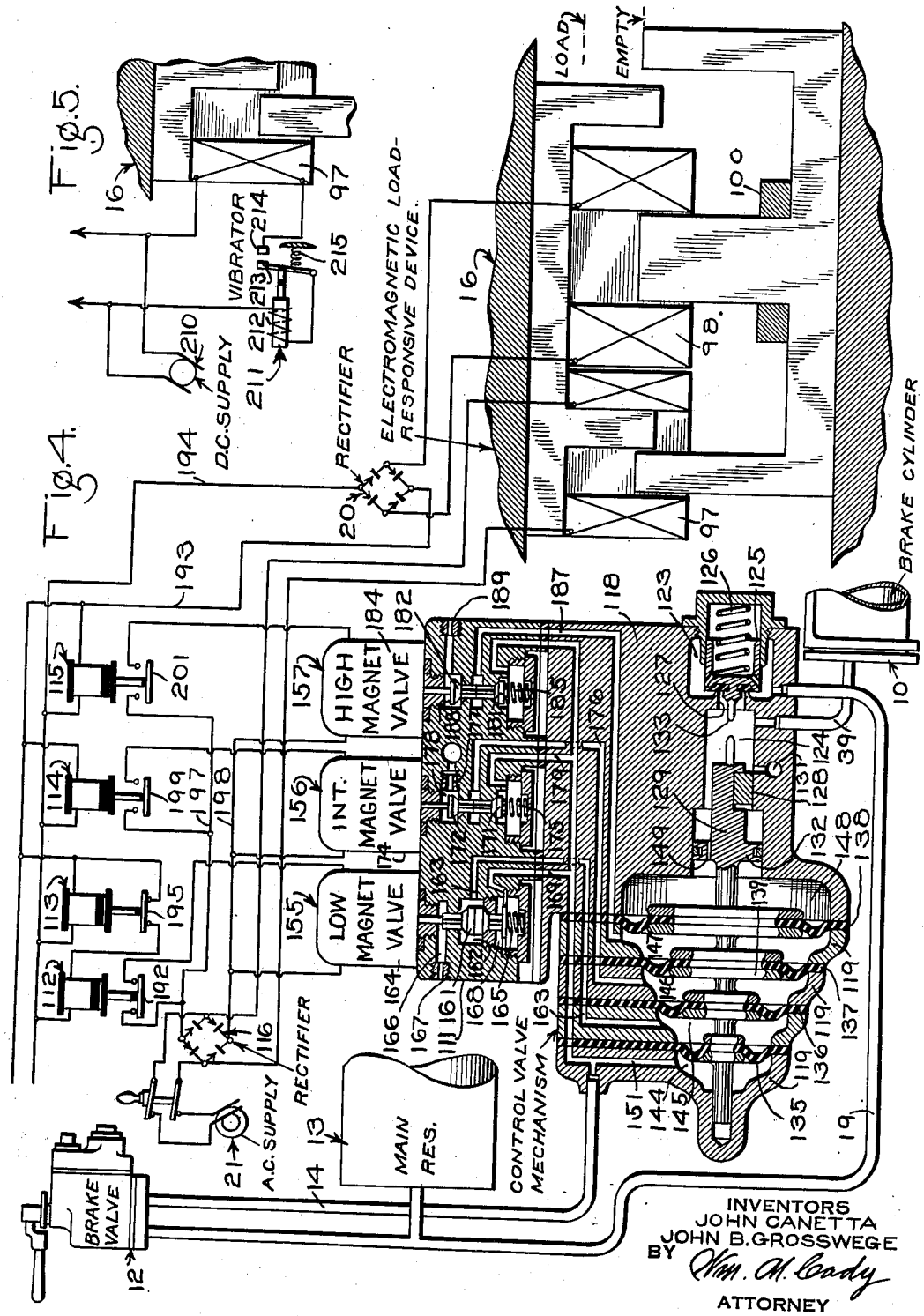

Patented May 30, 1939

2,160,211

UNITED STATES PATENT OFFICE 2,160,211

VARIABLE LOAD BRAKE

John Canetta, Wilkinsburg, and John B. Grosswege, Edgewood, Pa., assignors to The Westinghouse Air Brake Company, Wilmerding, Pa., a corporation of Pennsylvania Application April 27, 1937, Serial No. 139,128

21 Claims. (Cl. 303—22)

This invention relates to variable load brakes for vehicles such as railroad cars or trains, and has for its principal object the provision of a variable load brake equipment, including electromagnetic means responsive to variations in the load carried by a car or car truck for effecting a corresponding variation in the degree of application of the brakes on the car or car truck.

Another object of the invention is the provision of a variable load brake equipment of the character indicated in the foregoing object wherein the maximum attainable degree of brake application is limited substantially in proportion to the load carried by the car.

Another object of the invention is the provision of a variable load brake equipment in which the maximum degree of brake application is limited to one of a plurality of certain different uniform degrees for different ranges of load carried by the car.

Another object of our invention is the provision of an electromagnetic device including voltage translating means, the output voltage of which is varied in a novel manner.

Another object is the provision of an electromagnetic device of the character indicated in the foregoing object, wherein the output voltage of the voltage translating means is varied according to variations in the operating condition of the car or train, for example, in accordance with variations in load on a car or car truck.

Another object of the invention is the provision of a variable load brake equipment of the character indicated in the foregoing objects, wherein the electromagnetic load-responsive device may be energized from an alternating current source or from a pulsating direct current source.

The above objects and other objects of the invention, which will be made apparent in the subsequent description of our invention, are attained by the provision of several illustrative embodiments of our invention described hereinafter and shown in the accompanying drawings, wherein:

Fig. 1 is a simplified diagrammatic view, with parts thereof in section showing one embodiment of our invention, Figs. 2 and 3 are plan and elevational views respectively of the conoidal cam element of the control valve device shown in Fig. 1, Fig. 4 is a diagrammatic view showing another embodiment of my invention employing a different type of control valve mechanism, and Fig. 5 is a fragmentary diagrammatic view illustrating a pulsating direct current supply for the embodiments shown in Figs. 1 and 4 instead of an alternating current supply.

*Brief description of embodiment shown in Fig. 1*

The embodiment shown in Fig. 1 comprises, briefly, at least one brake cylinder 10, the supply of fluid under pressure to which is effected by a control valve device 11 which may be operated locally and directly by an operator, or indirectly by remote control from a brake valve device 12 in the manner shown. The brake valve device 12 is operative to supply fluid under pressure from a main reservoir 13 to a pipe, hereinafter called the control pipe 14, and a fluid-pressure-operated device 15 subject to the pressure in the control pipe 14 functions to cause operation of control valve device 11.

According to our invention there is further provided an electromagnetic load-responsive device 16 and an amplifier or relay 17 illustrated as a three electrode type of vacuum tube amplifier controlled by the load-responsive device 16 for supplying energizing current to a solenoid coil 18 constituting a part of the control valve device 11. Other equipment includes a pipe 19, constantly connected to the main reservoir and hereinafter called the main reservoir pipe, a full-wave rectifier 20, indicated as of the dry disc or copper-oxide type, a source 21 of alternating current supply, a filter including inductance coils 22 and condensers 23 for smoothing out the pulsations in the direct current output of the rectifier 20, and a potentiometer 24 for controlling the potential on the grid of the amplifier 17, and sources of direct current, illustrated as batteries 25 and 26, for the filament circuit and the plate circuit, respectively, of the amplifier 17.

*Detailed description of embodiment shown in Fig. 1*

Figure 1:
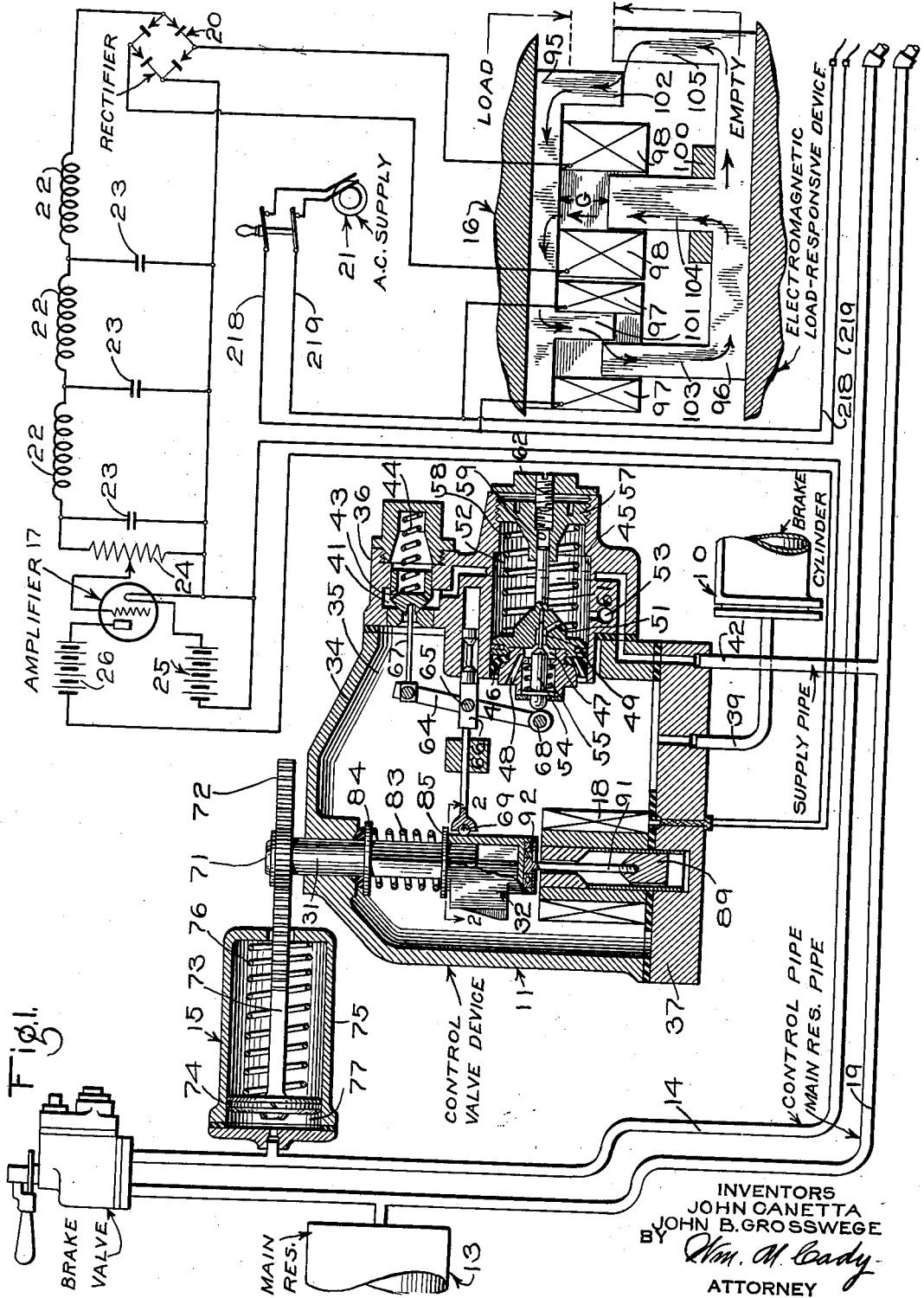

The brake valve device 12 is of a self-lapping type, such as described and claimed in Patent 2,042,112 of Ewing K. Lynn and Rankin J. Bush, effective upon operation of the operating handle 28 thereof from a normal brake release position to supply fluid under pressure from the main reservoir 13 to the control pipe 14 and establish a pressure in the control pipe 14 according to the degree or extent to which the operating handle is moved out of its normal position into an application zone. The brake valve device 12 is located on the control car of a train and functions to control the operation of one or more control valve devices 11 associated with different brake cylinders along the length of the train, only one control valve device 11 being shown for simplicity.

The control valve device 11 is of the type described and claimed in the copending application Serial No. 138,740 of John Canetta, one of the present joint applicants, which application was filed April 24, 1937. It is similar in construction to the brake valve device 12 and differs therefrom in having an operating shaft 31 rotated by operation of the pressure actuated device 15, having a different type of operating cam 32 in the form of a conoid associated with the operating shaft 31, and in having the solenoid coil 18 for adjusting the position of the conoidal cam 32 vertically along the operating shaft 31 according to variations in the load carried on the car in the manner to be hereinafter described in greater detail. In order to more conveniently understand our invention, a detailed description of the construction and operation of the control valve device 11 will be given.

The control valve device 11 comprises a sectional casing including a main section 34 having a chamber 35 formed therein which is closed at the side by a valve casing section 36 suitably attached in sealed relation to the main casing section 34 and which is closed at the bottom by a pipe bracket casing section 37 also suitably attached in sealed relation to the main casing section 34. The chamber 35, hereinafter called the pressure chamber, is shown as constantly connected by a pipe 38 to the brake cylinder 10, it being understood that relay valves may be provided between pressure chamber 38 and brake cylinder 10 if desired.

Formed in the valve section 36 is a chamber 41 which is constantly charged with fluid under pressure, as from the main reservoir 13 through the main reservoir pipe 19 and a branch pipe and passage 42. A supply valve 43 is normally yieldingly urged into seated relation on an associated valve seat by a spring 44 to cut off communication between the chamber 41 and the pressure chamber 35.

Also formed in the valve section 36 is a bore 45 containing a piston 46 having a chamber 47 therein. The chamber 47 is constantly connected to the pressure chamber 35 through a port or passage 48 in the piston and also through an axial bore 49 and a port 51 to a chamber 52 at the opposite side of the piston 46, which is constantly connected to atmosphere, as through an exhaust port and passage 53.

A pin type valve 54, hereinafter called the release valve, is contained in the chamber 47 and is normally yieldingly biased to an unseated position by a spring 55 to establish communication from pressure chamber 35 to atmosphere by way of passage 48, chamber 47, bore 49, port 51, chamber 52 and exhaust passage 53.

Interposed in the chamber 52 between the piston 46 and a threaded plug 57 screwed into the outer end of the bore 45 is a coil spring 58 which normally positions the piston 46 inwardly of the bore 45 and yieldingly opposes movement of the piston outwardly of the bore 45. In the plug 57 is an axial bore 59 having a smooth inner portion and a threaded outer portion. The smooth inner portion of the bore 59 receives the end of a stem 61 of the piston 46 and the outer threaded portion of the bore 59 receives a set screw 62 which is engaged by the outer end of the stem 61 of the piston 46 and serves as a stop to limit the movement of the piston 46 outwardly of the bore 45. A lock-nut 63 may be provided on the set screw 62 to prevent undesired loosening thereof.

Operation of the supply valve 41 and the release valve 54 is effected by means of a so-called "floating" lever 64 which is pivotally mounted intermediate its ends, as by a pin 65, on an actuating rod or stem 66 which is slidably mounted in the casing. One end of the lever 64 has pivotally attached thereto a rod or stem 67 which extends to and engages in a recess in the face of the supply valve 41 at the inner seated area thereof. At the opposite end of the lever 64 is mounted a roller 68 which engages the inner end of the release valve 54.

The inner end of the actuating rod 66 is formed to receive and hold a relatively small ball-bearing 69 for minimizing the friction at the point of contact with the cam surface of the conoidal cam element 32.

The rotary operating shaft 31 of the valve device 11 is suitably journaled in the main casing section 34, a portion of the shaft extending to the exterior of the casing and having fixed thereto a pinion gear 71 that meshes with a gear rack 72 formed on or attached to the stem 73 of a piston 74 which operates in a cylinder 75 of the pressure-actuated device 15. Interposed between the piston 74 and the end wall of the cylinder 75 is a spring 76 which is effective when fluid under pressure is entirely released from a chamber 77, at the opposite side of the piston 74 and in constant communication with the control pipe 14, for shifting the piston 74 to an extreme position in the left-hand direction, thereby correspondingly rotating the rotary shaft 31 to its normal position.

Figure 2:
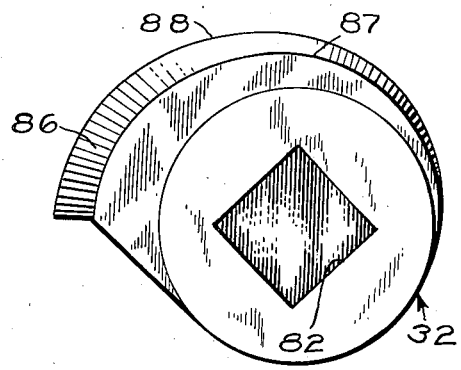
Figure 3:
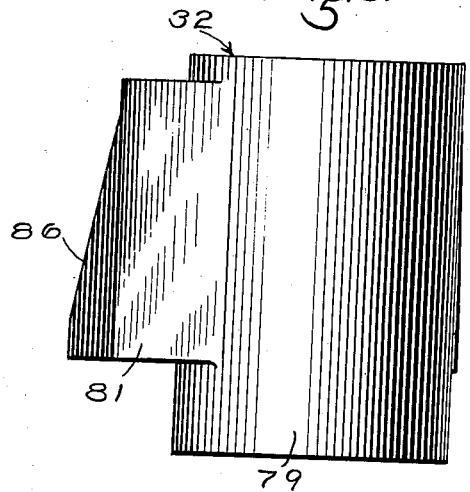

As will be seen in Figs. 1, 2 and 3, the conoidal cam element 32 comprises a cylindrical body portion 79 and a cam portion 81 preferably integral with body portion 79. At the upper end of the body portion 79 is a polygonal recess, shown as a square recess 82, for slidably receiving the inner end of the rotary shaft 31 of corresponding cross section. A spring 83, surrounding the rotary shaft 31 and interposed between a flange or collar 84 fixed to the shaft 31 and the upper face of the cam element 32, yieldingly opposes upward movement of the cam element 32 relative to the rotary shaft 31. If desired, a collar or washer 85 may be interposed between the spring and the upper end of the cam element 32.

As will be seen particularly in Figs. 2 and 3, the cam portion 81 of the cam element 32 has formed thereon a sloping cam surface 86 which connects an upper inner spiral 87 and a lower outer spiral 88. The sloping cam surface 86 will accordingly be seen to be in reality a succession of an infinite number of spiral line surfaces widening outwardly from the inner spiral line 87 to the outer spiral line 88, all of the spiral lines merging into a common vertical plane or line at the originating end of the spiral. The reason for the term "conoidal" as applied to the cam element 32 should accordingly be apparent.

The spirals 87 and 88 may be of any desired or suitable contour but are preferably of such contour that the actuating rod 66 is shifted in the right-hand direction, as viewed in Fig. 1, a distance which is proportional to the degree of rotary movement of the shaft 31 from its normal position.

With the rotary shaft 31 in its normal position, the ball-bearing 69, which is small enough to effect a substantially single point of contact with the cam surface 86 normally engages the cam surface 86 at the originating end of the cam surface 86 so that, regardless of the position of the cam element 32 vertically with respect to the rotary shaft 31, the actuating rod 66 is always returned to the same normal position upon the return of shaft 31 to its normal position.

If the ball-bearing 69 on the end of the actuating rod 66 engages the cam surface 86 adjacent the upper spiral line 87, it will be seen the actuating rod 66 is shifted a certain distance assuming rotation of the rotary shaft 31 through a given angle. Obviously, if the ball-bearing 69 at the end of the actuating rod 66 engages the cam surface 86 adjacent the lower spiral line 88, rotation of the rotary shaft 31 through the given angle will effect a greater displacement of the rod 66 in the right-hand direction. If the ball-bearing 69 at the end of the actuating rod 66 engages the cam surface 86 at a point intermediate the inner and outer spiral lines 87 and 88, it will be seen that the displacement of the actuating rod 66 in the right-hand direction for rotation of the rotary shaft 31 through the given angle will be greater than that for the spiral line 87 but less than that for the spiral line 88. The displacement of actuating rod 66 in the right-hand direction for rotation of shaft 31 through a given angle thus increases as the cam 32 is raised and decreases as the cam is lowered.

The position of the cam element 32 vertically relative to the rotary shaft 31 is determined according to the degree of energization of the solenoid coil 18. As shown, the solenoid coil 18 is mounted in insulated relation on the pipe bracket casing section 37 in coaxial relation to the rotary shaft 31, the solenoid coil controlling the position of a plunger 89 having a stem 91, which is secured to and rotatable within the lower end of the cam element 32, as by a ball-bearing race 92. Thus, the plunger 89 may be fixed against rotation on its axis without interfering with the free rotation of the cam element 32 by rotation of the rotary shaft 31.

Assuming that the rotary shaft 31 is rotated through a given angle from its normal position, and that the actuating rod 66 is correspondingly shifted in the right-hand direction, operation of the supply valve 41 and release valve 54 is effected in the following manner. The spring 55 is biasing the release valve 54 to unseated position is weaker than the spring 44 holding the supply valve 41 seated, and consequently shifting of the rod 66 in the right-hand direction causes the floating lever 64 to pivot about its upper end in such manner that the lower end thereof shifts in the right-hand direction to seat the release valve 54 and thus to cut off communication between the pressure chamber 35 and atmosphere. Since the spring 58, opposing movement of the piston 46 outwardly of the bore 45, is stronger than the spring 44 holding the supply valve 41 seated, further movement of the actuating rod 66 in the right-hand direction after the release valve 54 is seated causes the floating lever 64 to pivot about its lower end in such manner that the upper end thereof shifts in the right-hand direction and, through the stem 67, effects unseating of the suppy valve 41 against the force of the spring 44. Fluid under pressure is accordingly supplied from the main reservoir through the main reservoir pipe 19, branch pipe and passage 42, chamber 41, past the unseated valve 43 into the pressure chamber 35 and thence to the brake cylinder 10. When the pressure of the fluid supplied to the chamber 35 and the brake cylinder 10 builds up to a sufficient degree on the inner face of the piston 46, the spring 58 is overcome and the piston 46 moves outwardly of the bore 45. Thereupon, spring 44 becomes effective to shift the supply valve 43 to a seated position to cut off the further supply of fluid under pressure to the chamber 35, the release valve 54 being held seated to prevent the release of fluid under pressure from the chamber 35, due to the force exerted by the spring 44 which causes the floating lever 64 to pivot on the pin 65 intermediate the ends thereof.

If the rotary shaft 31 is rotated to a further extent away from its release position, the supply valve 43 is again unseated to again supply fluid under pressure to the pressure chamber 35 and brake cylinder 10 to increase the pressure therein, the supply of fluid under pressure to the chamber 35 being cut off when the pressure in the chamber 35 increases to a degree sufficient to overcome the spring 58 and cause reseating of the supply valve 43. It will thus be seen that the pressure established in the pressure chamber 35 and in the brake cylinder 10 is always proportional to the degree of rotation of the shaft 31 from its normal position.

The maximum degree of pressure, corresponding to normal pressure in the main reservoir 13, is attained in the pressure chamber 35 and brake cylinder 10 by rotating the rotary shaft 31 to a maximum degree out of its release position. In such case, the end of the stem 61 of the piston 46 is engaged by the stop screw 62, as the piston 46 is moved outwardly of the bore by the pressure built up in the chamber 35, before the supply valve 43 can be returned to seated position. Thus, supply valve 43 is maintained unseated and consequently the pressure from the main reservoir equalizes into the pressure chamber 35 and brake cylinder 10.

When the rotary shaft 31 is rotated back toward its normal position from an application position, the force holding the release valve 54 seated is relieved, and consequently the spring 55 becomes effective to unseat the release valve 54 and thus establish communication through which fluid under pressure is released from the pressure chamber 35 and brake cylinder 10 to atmosphere through the exhaust port 53. As the pressure in the chamber 35 reduces, spring 58 becomes effective to return the piston 46 inwardly of the bore 45 and thus to effect reseating of the release valve 54. If the rotary shaft 31 is again shifted a certain amount back toward its normal release position, the release valve 54 is again unseated, to further reduce the pressure in chamber 35, the reduction of pressure in the chamber 35 and brake cylinder 10 being cut off when the pressure in the chamber 35 is reduced sufficiently so that the spring 58 again returns the piston 46 to a further extent inwardly of the bore 45 to effect reseating of the release valve 54. The amount of the reduction of pressure in the chamber 35 and brake cylinder 10 will thus be seen to be proportional to the degree to which the rotary shaft 31 is returned toward its release position.

When the rotary shaft 31 is returned to its normal position, the release valve 54 remains unseated to reduce the pressure in the pressure chamber 35 and the brake cylinder 10 to atmospheric pressure since the spring 58 is ineffective to shift the piston 46 a sufficient degree inwardly of the bore 45 to effect reseating of the release valve 54.

Since the degree to which the actuating rod 66 is shifted in the right-hand direction from its normal position, for a rotation of the rotary shaft 31 through a given angle, increases as the cam element 32 is shifted upwardly relative to the rotary shaft 31, it will be understood that the pressure attained in the pressure chamber 35 and brake cylinder 10 for rotation of the rotary shaft 31 through the given angle will increase proportionately as the cam element 32 is raised from the position shown in Fig. 1.

Referring now to Fig. 1, the electromagnetic load-responsive device 16 comprising our invention includes an upper laminated magnetic core portion 95, a lower laminated magnetic core portion 96, and suitably carried in insulated relation on the upper magnetic core portion 95 a primary winding 97 and a secondary winding 98. The upper core portion 95 has two depending leg portions 101 and 102 and the lower core portion 96 has three upwardly extending leg portions 103, 104 and 105.

The upper core portion 95 and the lower core portion 96 are suitably mounted so as to be moved toward each other or away from each other, in fixed alignment to a degree proportional to the increase or decrease in load carried on a car or car truck, as for example by the device shown in Fig. 2 of Patent No. 1,670,391 to T. H. Thomas of May 22, 1928. The primary coil 97 surrounds the leg 101 of the upper core portion 95 and the leg 103 of the lower core portion 96 is so located as to move in a line adjacent to the leg 101 within the primary coil 97.

The central leg 104 of the lower core portion 96 is so located that it moves axially within the secondary coil 98 upon relative movement of the upper and lower core portions 95 and 96. The leg 102 of the upper core portion 95 and the leg 105 of the lower core portion 96 move in adjacent parallel lines upon relative movement of the upper and lower core portions 95 and 96.

For the empty condition of the car or car truck, the upper core portion 95 and lower core portion 96 are shifted to the maximum extent away from each other, as indicated by the broken line designated "empty". As the load on the car or car truck increases, the upper and lower core portions 95 and 96 are moved toward each other and with maximum or full load on the car or car truck, the upper core portion 95 and the lower core portion 96 are moved into the position indicated by a broken line designated "load". For an intermediate load on the car or car truck, the core portions 95 and 96 assume relative positions between the two positions designated "empty" and "load".

As indicated in Fig. 1, the primary winding 97 is energized from the source 21 of alternating current supply and a voltage is induced in the secondary winding 98 in the manner of a transformer or other similar voltage translating means.

The magnetic flux set up by excitation or energization of the primary winding 97 traverses the core portions 95 and 96 substantially in the manner indicated by the arrows, a portion of the flux traversing the central leg 104 of the lower core portion 96 and a gap G between the end of the leg 104 and the upper core portion 95 while another or by-pass portion of the flux traverses the leg 105 of the core portion 96 and the leg 102 of the upper core portion 95.

The cross-sectional area of the central leg of the lower core portion 96 is so designed and related to the cross-sectional areas of the legs 102 and 105 that the reluctance of the magnetic path through the leg 104 and gap G decreases in percentage of maximum reluctance much more compared to the percentage decrease of the reluctance of the magnetic path through the legs 105 and 102, for a given degree of movement of the core portions toward each other. Thus, as the upper core portion 95 and the lower core portion 96 approach each other, the magnetic flux diverted through the path including legs 105 and 102 becomes less and less so that the magnetic flux through the central leg 104 and gap G increases. The cross-sectional area of the central leg 104 of the lower core portion 96 relative to the cross-sectional area of the leg 102 and 105 may, therefore, readily be proportioned so that the number of flux lines or flux linkages traversing the central leg 104 of the lower core portion 96 and the gap G increases substantially in proportion to the degree to which the upper and lower core portions 95 and 96 approach each other from the "empty" position indicated.

Since the voltage induced in a winding is directly proportional to the number of flux linkages threading the winding, it will be seen that the voltage induced in the secondary winding 98 is substantially directly proportional to the degree to which the two core portions 95 and 96 approach each other from the "empty" position.

In order to inhibit undesired variations in the number of flux lines traversing the central leg 104 and consequently the voltage induced in the secondary coil 98, such as might be caused by movement of the magnetic core portions 95 and 96 relative to each other incident to jar and vibration of the car and car trucks during travel of the car or train along the road, a dampening ring 100 of copper or other suitable material may be provided surrounding the central leg 104.

According to our invention, we employ the output voltage of the secondary winding 98 of the electromagnetic load-responsive device 16 to control the degree of energization of the solenoid 18 of the control valve device 11 so that the position of the cam element 32, vertically with respect to the rotary shaft 31, will vary according to the load carried on a car or car truck.

Since it is desirable to energize the solenoid 18 by direct current instead of alternating current, the rectifier 20 is provided for converting the alternating current output of the secondary winding 98 to direct current. If the power output from the secondary winding 98 is sufficient, energizing current may be supplied directly from the rectifier 20 to solenoid 18. However, if the power output from the secondary winding 98 is insufficient to supply energizing current to the solenoid 18 to a sufficient degree to overcome the force of the opposing spring 83, an amplifying device, such as the vacuum tube amplifier 17 shown, may be employed. In such case, it is desirable to employ a filter circuit including inductances 22 and condensers 23 to smooth out the pulsating direct current output from the rectifier 20. The potentiometer 24 is provided in the output circuit from the rectifier 20 to control the degree of biasing voltage imposed on the grid of the vacuum tube amplifier 17.

The operation of the embodiment shown in Fig. 1 should now be apparent. Assuming that a car is empty and that a car truck is accordingly carrying its lightest load, the voltage induced in the secondary winding 98 of the electromagnetic load-responsive device 16 is such as to energize the solenoid 18 to a minimum degree wherein the cam element 32 is in its lowest position relative to the rotary shaft 31. If, now, an application of the brakes is effected by operation of the brake valve device 12, the corresponding degree of pressure established in the chamber 77 of the pressure-actuated device 15 correspondingly rotates and positions the rotary shaft 31 of the control valve device 11 and thus establishes a certain pressure in the brake cylinder 10 corresponding to the degree of movement of the handle 28 of the brake valve device 12 out of its normal release position.

If the load on the car or car truck is greater and the voltage output from the secondary winding 98 of the electromagnetic load-responsive device correspondingly greater, the increased energization of the solenoid 18 causes the plunger 39 to be shifted upwardly to correspondingly shift the conoidal cam element 32 upwardly from its normal position to a degree dependent upon and in proportion to the increase in load. Thus, for the same degree of operative movement of the operating handle 28 of the brake valve device 12 into its application zone, as assumed in the previous case, the actuating rod 66 is shifted in the right-hand direction a greater amount according to the slope of the cam surface 86, and an increased brake cylinder pressure is accordingly established in proportion to the increase in load.

When the car or car truck is carrying its maximum load and the voltage output from the secondary winding 98 of the electromagnetic load-responsive device 16 is a maximum, solenoid 18 is correspondingly energized to a maximum degree to shift the conoidal cam element 32 upwardly a maximum degree so that the ball-bearing 69 on the end of the actuating rod 66 travels substantially along the line of the lower spiral line 88 on the cam surface 86 thereby effecting a maximum brake cylinder pressure for a given degree of rotary movement of the shaft 31.

In a similar manner, if the load on a car or car truck is decreased from the maximum load and the voltage output from the secondary winding 98 of the electromagnetic load-responsive device 16 correspondingly reduced, the reduced energization of the solenoid 18 causes the conoidal cam element 32 to be lowered and, thus, for a given degree of rotary movement of the shaft 31 from release position, a lower brake cylinder pressure will be effected.

Our invention is of particular advantage and utility in the case of a locomotive tender brake equipment where the load on the tender truck is constantly reducing due to consumption of coal and water.

Since the load on the tender of the locomotive is constantly changing, it is difficult for the engineman to accurately gage the degree to which the brakes on the tender may be applied without causing the wheels to slide due to an excessive application of the brakes. By means of our invention, therefore, the degree of application of the brakes is automatically and accurately proportioned to the load on the tender truck. Thus the engineman may shift the operating handle 28 of the brake valve 12 on the control car or locomotive to a certain position in the application zone to establish a certain pressure in the control pipe 14, but the pressure in each brake cylinder controlled by a separate control valve device 11 may be different depending upon the position of the cam element 32 as controlled by the electromagnetic load-responsive device 16 associated therewith.

Regardless of the position of the cam element 32 with respect to the rotary shaft 31, the return of the operating handle 28 of the brake valve device 12 to normal release position always effects complete release of all the brakes, because the cam surface 86 merges into a common line equidistant at all points from the axis of the cam element, and thus causes the return of the actuating rod 66 to the same release position to effect complete release of fluid under pressure from the brake cylinder 10.

*Embodiment shown in Fig. 4*

The embodiment shown in Fig. 4 differs from the embodiment shown in Fig. 1 principally in the provision of a control valve mechanism 111 in place of the control valve device 11 and in the provision of a plurality of control relays 112, 113, 114, and 115 for controlling the operation of the control valve mechanism. Also an additional rectifier 116 of the dry disc type similar to the rectifier 20 is provided which converts the alternating current supplied from the source 21 into direct current of substantially constant voltage independent of variations in load for controlling the magnet valve devices of the control valve mechanism 111.

The control valve mechanism 111 is illustrative of the type of control valve mechanism described and claimed in the copending application, Serial No. 88,098 of Ellis E. Hewitt, filed June 30, 1936, and assigned to the assignee of the present application. As illustrated, the control valve mechanism 111 may comprise a casing having a main valve section 118, a plurality of diaphragm clamping sections 119 and a magnet valve section 120 secured together in sealing relation in any suitable manner.

Formed in the casing section 118 is a chamber 123 which is constantly charged with fluid under pressure from a source of supply, such as the main reservoir 13, through the pipe 19. Connection between the chamber 123 and a slide valve chamber 124, to which the brake cylinder 10 is connected as by the pipe 39, is under the control of a supply valve 125 in the form of a valve piston which is normally yieldingly urged into seated position on an associated valve seat by a spring 126 to close a port or passage 127 connecting chambers 123 and 124.

Contained in the chamber 124 and slidable on an associated valve seat is a slide valve 128, hereinafter called the release valve, which is shifted on its seat by movement of an operating stem 129 to open and close an exhaust port or passage 131 connecting the chamber 124 to atmosphere. Formed on or attached to the stem 129 is a guide piston 132 which operates in an enlarged portion of the chamber 124.

When the stem 129 is shifted in a right-hand direction from the position shown, it first shifts the release valve 128 correspondingly to cover the exhaust port 131 and cut off the connection between the chamber 124 to the atmosphere, and then engages the end of a central stem 133 on the supply valve 125, which stem projects through the passage 127 into the chamber 124, to effect unseating of the supply valve 125 against the force of the spring 126. On the reverse movement of the stem 129, the supply valve is first seated and then the release valve 128 is shifted to uncover the exhaust port 131.

Shifting of the stem 129 is effected by means of the fluid pressure forces acting on a plurality of co-axially spaced diaphragms 135, 136, 137 and 138 of successively increasing effective pressure areas in the order named. The largest diaphragm 138 is clamped at the periphery thereof between the casing section 118 and one of the casing sections 119 and is suitably connected co-axially to the stem 129. The diaphragms 135, 136, 137 and 138 are connected together, as by spool-shaped spacers 139 connected or screwed together through perforations (not shown) at the center of the diaphragms. It will thus be seen that any unbalanced fluid pressure force exerted on one or more of the diaphragms is effective to shift the diaphragms as a unit and thus cause shifting of the release valve operating stem 129.

Formed between the larger diaphragm 138 and the piston 132 is a chamber 148 which communicates with the slide valve chamber 124 through a port 149 in the piston 132. Formed between the diaphragms 138 and 137 is a chamber 147 and between the diaphragms 137 and 136 is a chamber 146. Likewise, formed between the diaphragms 136 and 135 is a chamber 145, and between the diaphragm 135 and the outside casing section 119 is a chamber 144. The chamber 144 is constantly connected by a passage 151 to the control pipe 14 and is thus always charged with fluid under pressure at the pressure established in the control pipe 14. The supply and the release of fluid under pressure from the chambers 145, 146 and 147 is under the control of three magnet valve devices, respectively, designated hereafter as low magnet valve device 155, intermediate magnet valve device 156 and high magnet valve device 157.

The low magnet valve device 155 comprises a double beat valve 161, which is contained in a chamber 162 constantly connected to the chamber 145 through a passage 163, and an electromagnet 164 which is effective when energized to shift the double beat valve from an upper seated position to a lower seated position against the force of a biasing spring 165. With the electromagnet 164 energized and the double beat valve 161 correspondingly in its lower seated position, communication is established from the chamber 162 past the open upper seat of the valve 161 to an atmospheric passage 166 containing a choke fitting 167. When the electromagnet 164 is deenergized, the spring 165 shifts the double beat valve to its upper seated position to cut off the communication just described and to establish communication past the open lower seat of the valve from the chamber 162 to a chamber 168 which is constantly connected to the passage 151 through a branch passage 169. Thus, if the control pipe 14 is charged with fluid under pressure, deenergization of the electromagnet 164 causes chamber 145 to be charged to the pressure of the fluid in the control pipe 14. If the chamber 145 is charged with fluid under pressure from the control pipe 14, energization of the electromagnet 164 causes fluid under pressure to be released from the chamber 145 to atmosphere through the choke fitting 167.

The intermediate speed magnet valve device comprises a pair of oppositely seating valves, hereinafter called the supply valve 171 and the release valve 172, and an electromagnet 174 for shifting the supply valve 171 and release valve 172 from seated and unseated positions, respectively, to unseated and seated positions, respectively, against the force of a biasing spring 175. When the electromagnet 174 is deenergized the unseated release valve connects a passage 175, leading out of the chamber 146, to an atmospheric chamber 177 which is connected to atmosphere through a choke fitting 178. When the electromagnet 174 is energized, the release valve 172 is seated to cut off the exhaust communication just described and the supply valve 171 is unseated to establish communication therepast from a branch passage 179, connected to the passage 151, to the passage 176 leading to the chamber 146 to thereby effect charging of the chamber 146 according to the pressure established in the control pipe 14.

The high magnet valve device 157 is identical in construction to the intermediate magnet valve device 156 and comprises a pair of oppositely seating supply and release valves 181 and 182 and an electromagnet 184 effective when energized to cause shifting of the valves from their normally seated and unseated positions, respectively, to unseated and seated positions, respectively, against the force of a yielding spring 185. With the electromagnet 184 deenergized, communication is established past the unseated release valve 182 from a passage 187, connected to the chamber 147, to a chamber 188 which is open to atmosphere through a passage having a choke fitting 189 therein. When the electromagnet 184 is energized, the release valve 182 is shifted to seated position to close the exhaust communication for the chamber 147 just described, and the supply valve 181 is unseated to open communication through which fluid under pressure is supplied from the passage 151 to the passage 187 leading to the chamber 147 to thereby cause the chamber 147 to be charged to the pressure of the fluid as established in the control pipe 14.

Summarizing briefly, it will be seen that when the low magnet valve 155 is energized and the magnet valve devices 156 and 157 are deenergized, the chambers 145, 146 and 147 will be vented to atmosphere. With all of the magnet valve devices 155, 156 and 157 deenergized, the chamber 145 is charged with fluid under pressure from the control pipe 14 while the chambers 146 and 147 remain vented to atmosphere. With only the intermediate magnet valve device 156 energized, chambers 145 and 146 are charged with fluid under pressure from the control pipe 14 while the chamber 147 remains vented to atmosphere. With the magnet valve device 155 deenergized and the magnet valve devices 156 and 157 both energized, all of the chambers 145, 146 and 147 are charged with fluid under pressure from the control pipe 14. As previously stated, the chamber 144 is always charged to the pressure in the control pipe since it is directly connected thereto.

The magnet valve devices 155, 156 and 157 are controlled according to the output voltage of the secondary winding 98 of the electromagnetic load-responsive device through the medium of the control relays 112, 113, 114 and 115. The relays 112, 113, 114, and 115 are of the retarded or slow pick-up and slow drop-out type, for a reason which will be hereinafter made apparent, although the relay 112 may be of a type which picks up and drops out without a time lag or delay interval. All of the relays 112, 113, 114 and 115 are of the so-called voltage-responsive type, the relays being so designed as to be operated to a picked-up position at successively increasing voltages, respectively. For example, the relay 112 is operatively energized, that is picked-up, at a relatively low voltage, the relay 113 is picked-up only at a higher voltage, the relay 114 is picked-up only at a still higher voltage, and the relay 115 is picked-up only at a maximum high voltage.

The windings of each of the relays 113, 114 and 115 are connected across two wires 193 and 194 that are connected to the opposite output terminals of the rectifier 20, which rectifies the alternating current output from the secondary winding 98 of the electromagnetic load-responsive device 16. The winding of the relay 112 is connected across the wires 193 and 194 in series with a contact member 195 of the relay 113 which is in circuit-closing position only when the relay 113 is not picked-up.

The electromagnet 164 of the low magnet valve device 165 is connected in series with a contact member 192 of the relay 112, across a pair of wires 197 and 198 that are connected to opposite output terminals, respectively, of the rectifier 116.

The electromagnet 174 of the intermediate magnet valve device 156 is connected in series with a contact member 199 of the relay 114 across the wires 197 and 198, the contact member 199 being in circuit-opening position as long as the relay is not picked-up.

The electromagnet 184 of the high magnet valve device 157 is connected in series with a contact member 201 of the relay 115 across the wires 197 and 198, the contact member 201 being in circuit-opening position as long as the relay is not picked-up.

In operation, assuming that the equipment shown in Fig. 4 is conditioned as shown, that is that the main reservoir is charged with fluid at the normal pressure carried therein, that the car or train is traveling along the road with the brakes released, and that the electromagnetic load-responsive device 16 registers an empty condition on the car or car truck, an application of the brakes is effected by operation of the brake valve device 12 as in the first embodiment. As previously explained, the output voltage of the secondary winding 98 of the electromagnetic load-responsive device 16 is a minimum for an empty condition, and only the relay 112 is picked-up by such minimum voltage. The contact member 192 of relay 112 is accordingly actuated to circuit-closing position to effect energization of the electromagnet 164 of the low magnet valve device 165 of the control valve mechanism 111. The winding of the relays 113, 114 and 115 are subject to the output voltage from the rectifier 20 but, for the empty condition of the car, this voltage is not high enough to pick up any of these relays.

It will thus be seen that since only the electromagnet 164 of the magnet valve device 155 is energized, and the chambers 145 and 146 and 147 between the diaphragms vented to atmosphere correspondingly, the diaphragms are urged in the right-hand direction by a force which is equal to the unit pressure of the fluid established in the control pipe 14, and accordingly in the chamber 144, multiplied by the effective area of the smallest diaphragm 135.

In order to more readily comprehend the operation of the control valve mechanism 111, let it here be assumed that the effective pressure areas of the diaphragms 135, 136, 137 and 138 may be expressed as one, two, three and four units of area, respectively. Now, as a result of the force of the pressure in the chamber 144 shifting the diaphragms in the right-hand direction, the release valve 128 and supply valve 125 are successively operated to close off the exhaust from the chamber 124 and brake cylinder 10 to atmosphere and to cause fluid under pressure to be supplied through the chamber 124 to the brake cylinder 10. As the pressure of the fluid supplied to the chamber 124 and brake cylinder 10 builds up, there is a corresponding build-up of pressure in the chamber 148 at the right-hand side of the largest diaphragm 138 due to the connection between the chamber 148 and chamber 124 through the port 149 in the piston 132.

When the force of the pressure acting in chamber 148 over the effective pressure area of the largest diaphragm 138 substantially balances the force of the pressure in the chamber 144 acting in the opposite direction on the smallest diaphragm 135, the spring 126 becomes effective to seat the supply valve 125 to cut off the further supply of fluid under pressure to the chamber 124 and brake cylinder 10. Upon the cut off of the supply of fluid under pressure to the brake cylinder, the shifting of the stem 129 backwardly is stopped so that the release valve 128 is not moved sufficiently to uncover the exhaust port 131.

It should now be apparent that the pressure thus established in the brake cylinder 10 will bear a certain uniform ratio to the pressure established in the control pipe 14, such ratio being the ratio of the effective pressure area of the diaphragm 135 to the effective pressure area of the diaphragm 138. Accordingly, assuming that a pressure of one hundred pounds per square inch was established in the control pipe 14 by operation of the brake valve 12, a pressure of twenty-five pounds per square inch is established in the brake cylinder 10.

If now it is desired to release the brakes, the handle of the brake valve 12 is operated to release position to reduce the pressure in the control pipe 14 and chamber 144 to atmospheric pressure. Thereupon the force of the brake cylinder pressure acting on the diaphragm 138 in the chamber 148 shifts the stack of the diaphragms in the left-hand direction so as to move the release valve 128 correspondingly to uncover the exhaust port 131 and thus release fluid under pressure from the brake cylinder. When the pressure in the chamber 144 and in the chamber 148 are again equalized at atmospheric pressure, the diaphragm and the release valve 128 are again positioned as shown in the drawings.

Let it now be assumed that the load on the car or car truck is increased and that the output voltage from the secondary winding 98 of the electromagnetic load-responsive device 16 is correspondingly increased a sufficient degree to cause the relay 113 to pick up but not sufficiently to pick up the relays 114 and 115. After a predetermined interval of time corresponding to the time lag of response of relay 113 following the increase in voltage output from the rectifier 20, contact member 195 of the relay 113 shifts to circuit-opening position to effect deenergization of the winding of the relay 112. The purpose of the time delay in response of the relay 113, and also of relays 114 and 115, is to prevent momentary voltage fluctuations, such as might result from the road shocks and jars on the vehicle and without any change in load, from effecting operative energization, that is, pick-up of the relays 113, 114, and 115. The dampening ring 100 tends to stabilize the voltage output from the secondary winding to also prevent undesired pick-up of relays 113, 114 and 115. If the output voltage from the secondary winding 98 and thus from the rectifier 20 is maintained, however, at an increased value, as it is in the case of an increased load, then the continued energization of the winding of the relay 113 at the increased voltage causes the contact member 195 to be shifted to circuit-opening position after the elapse of the predetermined interval of time.

Deenergization of the winding of the relay 112 results in shifting of the contact member 192 of the relay 112 to circuit-opening position and thus interruption of the circuit for energizing the electromagnet 164 of the low magnet valve device 155. As a result, the control pipe 14 and passage 151 is connected to the chamber 145.

If now, an application of the brakes is subsequently initiated by operation of the brake valve 12 and a chosen pressure, such as one hundred pounds per square inch, is established in the control pipe 14, both of the chambers 144 and 145 are simultaneously charged to the pressure in the control pipe 14. Since the pressure of the fluid on opposite sides of the smallest diaphragm 135 is thus balanced, it will be apparent that the force urging the stack of diaphragms in the right-hand diirection is that resulting from the pressure in the chamber 145 acting over the effected pressure area of the diaphragm 136. Operation of the release valve 128 and supply valve 125 is accordingly effected, as in the previous instance, to cause build-up of fluid under pressure in the chambers 124 and 148 and in the brake cylinder 10. In this case, however, the pressure established in the brake cylinder for the same chosen pressure of one hundred pounds per square inch in the control pipe 14 will be higher than in the previous instance and will be in ratio to the pressure established in the control pipe as the effective pressure area of the diaphragm 136 is to the effective pressure area of the diaphragm 138. On the basis of the assumed effective pressure area of these diaphragms of two and four units of area, respectively, it will be seen that the pressure established in the brake cylinder in this case is one-half of that established in the control pipe 14, or fifty pounds per square inch.

Release of the brakes is effected, as in the previous instance, by returning the handle of the brake valve 12 to release position to restore the pressure in the control pipe 14 and chambers 144 and 145 to atmospheric pressure, whereupon pressure in the brake cylinder 10 is reduced to atmospheric pressure in the manner previously described.

Assuming now that the load on the car or car truck is still further increased and that the output voltage from the secondary winding 98 of the electromagnetic load-responsive device 16 correspondingly increases sufficiently to cause pick-up of the relay 114 without however, picking up the relay 115, it will be seen that after a time delay of response of relay 114, shifting of contact member 199 to circuit-closing position, effects energization of electromagnet 174 of intermediate magnet valve device 156.

When an application of the brakes is initiated by operation of the brake valve 12 and the control pipe 14 is charged to a chosen pressure, the chambers 144, 145 and 146 will accordingly be charged to the pressure in the control pipe 14. Thus, since the fluid pressure forces on opposite sides of the two diaphragms 135 and 136 are balanced, it is the force exerted on the diaphragm 137 by the fluid under pressure in the chamber 146 which determines the degree of brake cylinder pressure established. On the basis of a ratio between the areas of the diaphragms 137 and 138 of three to four as previously assumed, it will be seen that for a one hundred pound pressure in the control pipe 14, a pressure of seventy-five pounds is established in the brake cylinder 10.

If the car or car truck carries maximum load, and the output voltage from the secondary winding 98 is thus sufficiently high to operatively energize, that is pick-up the relay 115, then contact member 201 of the relay 115 is shifted to circuit-closing position to effect energization of the electromagnet 184 of the high magnet valve device 157 so that upon charging of the control pipe 14, all of the chambers 144, 145, 146 and 147 are charged with fluid at the pressure in the control pipe 14. In this case, the fluid pressures on opposite sides of the diaphragms 135, 136 and 137 are balanced and the force of the fluid pressure in chamber 147 acting on one face of diaphragm 138 determines the degree of pressure established in the brake cylinder. Obviously, in this case, a pressure equivalent to that in the chamber 147 and in the control pipe 14 must be established in the brake cylinder 10 and chamber 148 before cut-off of the supply of fluid under pressure to the brake cylinder can be effected. Therefore, for a pressure of one hundred pounds per square inch in the control pipe 14, a pressure of one hundred pounds per square inch will be built up in the brake cylinder 10.

It will thus be apparent that the control valve mechanism 111 controls the ratio between the pressure established in the control pipe 14 and that established in the brake cylinder 10 depending upon the load carried by the car or car truck. It will likewise be apparent, that in the case of variations of load while running along the road as in the case of the locomotive tender, the magnet valve devices 155, 156 and 157 are correspondingly conditioned so that when the control pipe 14 is charged with fluid under pressure to initiate an application of the brakes, the actual brake cylinder pressure established will bear successively lower ratios to a chosen pressure established in the control pipe as the load on the car or car truck reduces.

*Embodiment shown in Fig. 5*

In Fig. 5, is shown the manner in which either of the equipment shown in Fig. 1 and Fig. 4 may be operated from a source of direct current supply instead of from an alternating current supply. As shown fragmentarily in Fig. 5, the primary winding 97 of the electromagnetic load-responsive device 16 is energized by a pulsating direct current, the pulsating direct current being produced by means of a vibrator or make-and-break switch 211 of well known construction connected in series with the primary winding 97 across the terminals of the direct current source of supply 210.

As indicated diagrammatically, the vibrator 211 may comprise an electromagnet winding 212 effective, when energized, to shift a movable contact member 213 out of engagement with a fixed or stationary contact member 214 against the force of a resisting spring 215. The separation of the contact members 213 and 214 interrupts the energizing circuit for winding 212 and thus the magnetic force pulling the contact member 213 away from the contact member 214 is released and the spring 215 becomes effective to reengage the contact member 213 with the contact member 214. Upon reengagement of contact members 213 and 214, the electromagnet winding 212 is again energized to cause the contact member 213 to pull away from the contact member 214 and the cycle repeated. The circuit through the primary winding 97 of the electromagnetic load-responsive device 16 from the source 210 of direct current supply being under control of the vibrator 211 is accordingly alternately closed and opened, and primary winding 97 is energized by a pulsating direct current. Thus the flux linking the primary coil 97 with the secondary coil 98 of the electromagnetic load-responsive device 16 is increased and decreased alternately so as to induce an alternating-current voltage in the secondary winding 98.

*Application of invention to a train brake equipment*

The various embodiments of our invention hereinbefore described are, as intimated, readily applicable in the control of the brake equipment for a train of cars either of the articulated or usual non-articulated type. In such case, the source 21 of alternating current supply may be located on a control car, such as the locomotive, and the primary winding 97 of each electromagnetic load-responsive device connected across a pair of train wires 218 and 219 in the manner shown in Fig. 1.

Similarly, the pressure-actuated device, corresponding to the pressure-actuated device 15, for each control valve device 11, is connected to the control pipe 14 and the supply of fluid under pressure for the brake cylinder 10 through each control valve device 11 is through a branch pipe corresponding to the branch pipe 42.

In longer trains, however, it is desirable to provide a local supply reservoir at intervals along the length of the train whereby an immediate and adequate supply of pressure for the brake cylinders is available instead of relying on a single main reservoir pipe 19 in the manner shown. Furthermore, the control valve device 11 need not necessarily supply fluid under pressure directly to the brake cylinder but may control the supply of fluid under pressure to relay valve devices which in turn control the supply of fluid under pressure from the local supply reservoirs to the brake cylinders in a manner well known to those skilled in the art.

It will be understood that the manner of charging the control pipe 14 is merely illustrative, it being understood that any other suitable manner for charging the control pipe may be employed, for example, a plurality of electropneumatic valve mechanisms at intervals along the length of the train or a plurality of automatic valves such as a standard triple valve controlled by reduction in a train or brake pipe pressure.

*Summary*

Summarizing, it will be seen that the present invention comprises a vehicle brake equipment including an electromagnetic or voltage translating device having a primary and a secondary coil and two relatively movable magnetic core elements, associated with the primary and secondary coils, and moved relative to each other according to a variable operating condition of the vehicle such as the load on the vehicle, the core elements being so constructed and arranged that the voltage induced in the secondary coil of the voltage translating device varies in accordance with the variable operating condition of the vehicle. While our invention is of particular utility in connection with a variable load type of brake equipment, it will be apparent that the voltage translating device which we have provided is adapted for other applications and for control in accordance with any variable operating condition, not merely the load on a vehicle. As shown in Fig. 5 of the drawings, the primary coil of the voltage translating device may be energized by a pulsating direct current instead of an alternating current as in the other embodiments shown.

It will also be seen that the present invention includes novel combinations of elements for effecting control of two different forms of brake control valve devices.

While we have shown and described only several embodiments of our invention it will be apparent that various omissions, additions or modifications may be made in the illustrated embodiments without departing from the spirit of our invention. It is, therefore, not our intention to limit the scope of our invention except as it is necessitated by the scope of the prior art.

Having now described our invention, what we claim as new and desire to secure by Letters Patent, is:

1. In a vehicle brake equipment, in combination, a pair of inductively coupled coils, one of which has a substantially constant alternating current voltage impressed thereon and the other of which has a voltage induced therein upon energization of the said one coil, means for varying the flux coupling the two coils, without varying the effective alternating current voltage impressed on said one coil to cause the voltage induced in the said other coil to vary according to a variable operating condition of the vehicle, and means controlled according to the voltage induced in said other coil for correspondingly controlling the degree of application of the brakes.

2. In a vehicle brake equipment, in combination, a pair of inductively coupled coils, one of which has a substantially constant alternating current voltage impressed thereon and the other of which has a voltage induced therein upon energization of the said one coil, means for varying the flux coupling the two coils, without varying the effective alternating current voltage impressed on said one coil, to cause the voltage induced in the said other coil to vary according to the load on the vehicle, and means controlled according to the voltage induced in the said other coil for correspondingly controlling the degree of application of the brakes.

3. In a vehicle brake equipment, in combination, a pair of inductively coupled coils, one of which has a voltage induced therein upon energization of the other, magnetic core means associated with said coils, said coils and said core means being movable to different positions with respect to each other according to variations in a variable operating condition of the vehicle for causing the voltage induced in the said one coil to correspond to the variable operating condition, and means controlled according to the voltage induced in the said one coil for correspondingly controlling the degree of application of the brakes.

4. In a vehicle brake equipment, in combination, a primary coil, a secondary coil inductively coupled to the said primary coil and having a voltage induced therein upon energization of the primary coil, movable magnetic core means for varying the magnetic flux linkage between the primary and secondary coils and accordingly the voltage induced in the secondary coil, and electroresponsive means controlled according to the voltage induced in the said secondary coil for controlling the degree of application of the brakes.

5. In a vehicle brake equipment, a primary coil, a secondary coil inductively coupled to the said primary coil and having a voltage induced therein upon energization of the primary coil, movable magnetic core means associated with said primary and said secondary coils and so constructed and arranged as to vary the magnetic flux linkage between the primary and secondary coils upon movement of the magnetic core means according to a variable operating condition of the vehicle so that the voltage induced in the secondary coil corresponds to the variable operating condition, and electroresponsive means controlled according to the voltage induced in said secondary coil for controlling the degree of application of the brakes.

6. In a vehicle brake equipment, a primary coil, a secondary coil inductively coupled to the said primary coil and having a voltage induced therein upon energization of the primary coil, relatively movable magnetic core elements associated with the said coils and so constructed and arranged as to vary the magnetic flux linkage between the primary and secondary coils in accordance with the relative positions of the core elements and thereby correspondingly varying the voltage induced in the secondary coil, and electroresponsive means controlled according to variations in the voltage induced in the secondary coil for controlling the degree of application of the brakes.

7. In a vehicle brake equipment, a primary coil, a secondary coil inductively coupled to said primary coil and having a voltage induced therein upon energization of the primary coil, two movable magnetic core elements associated with said coils and having different relative positions corresponding to the load on a vehicle, said core elements being so constructed and arranged that the magnetic flux linking the primary and secondary coils for the different relative positions of the core elements causes a voltage to be induced in the secondary coil which is in accordance with the load on the vehicle, and electroresponsive means controlled according to the voltage induced in the said secondary coil for controlling the degree of application of the brakes.

8. In a vehicle brake equipment, in combination, a primary coil, a secondary coil inductively coupled to the primary coil and having a voltage induced therein upon energization of the primary coil, an alternating current source for energizing the said primary coil at a substantially constant voltage, magnetic core means associated with and movable relative to the said coils in such manner as to effect variation of the voltage induced in the secondary coil in accordance with a variable operating condition of the vehicle, and electroresponsive means controlled according to the voltage induced in the secondary coil for controlling the degree of the brake application.

9. In a vehicle brake equipment, electroresponsive means for controlling the degree of brake application, a source of alternating current, a source of direct current, a primary coil constantly energized by current supplied from said alternating current source, a secondary coil inductively coupled to the primary coil and having a voltage induced therein upon energization of the primary coil, magnetic core means associated with said coils and movable relative thereto in such manner as to cause the voltage induced in the secondary coil to be substantially in accordance with a variable operating condition of the vehicle, and means controlled according to the voltage induced in the said secondary coil for controlling the supply of current from said direct current source to said electroresponsive means.

10. In a vehicle brake equipment, in combination, electroresponsive means energizable to varying degrees to correspondingly vary the degree of a brake application, a primary coil, a secondary coil inductively coupled to the primary coil and having a voltage induced therein upon energization of the primary coil, magnetic core means associated with said coils and movable in such manner as to cause the voltage induced in the said secondary coil to correspond in degree to a variable operating condition of the vehicle, and means controlled according to the voltage induced in the said secondary coil for correspondingly controlling the degree of current supplied to the said electroresponsive means.

11. In a vehicle brake equipment, in combination, a primary coil, a secondary coil inductively coupled to the primary coil and having a voltage induced therein upon energization of the primary coil, magnetic core means associated with said coils and movable in such manner as to cause the voltage induced in the said secondary coil to correspond substantially in degree to a variable operating condition of the vehicle, a rectifier for converting the alternating current output from the said secondary coil to direct current, and electroresponsive means controlled according to the direct current output from said rectifier for controlling the degree of a brake application.

12. A vehicle brake equipment comprising in combination, a primary coil, a secondary coil inductively coupled to the primary coil and having a voltage induced therein upon energization of the primary coil, two cooperating magnetic core elements associated with the primary and secondary coils and shiftable to different positions relative to each other to vary the magnetic flux linking the two coils and thus to vary the voltage induced in the said secondary coil according to a variable operating condition of the vehicle, and means associated with one of said core elements for inhibiting rapid unsustained variations in the magnetic flux linking the primary and secondary coils.

13. In a vehicle brake equipment, in combination, a brake cylinder, a manually operated element, means operative in response to the operation of the manually operated element to establish a fluid pressure in the brake cylinder according to the degree of movement of the manually operated element away from a normal position thereof, electroresponsive means for varying the response of the said last means to a given operative movement of the manually operated element to thereby cause different brake cylinder pressures to be established for a given operative movement of the manually operated element from its normal position, a voltage translating means having relatively movable parts variously positioned in response to variations in a variable operating condition of the vehicle for causing the voltage output of said translating means to correspond substantially to the variable operating condition of the vehicle, and means controlled according to the voltage output of the translating means for controlling the said electroresponsive means.

14. In a variable load brake equipment for a car or train, in combination, a brake cylinder, a normally uncharged pipe chargeable with fluid at different pressures, means operative in response to the pressure in said pipe for establishing a pressure in the brake cylinder having only a limited number of certain different fixed ratios to the pressure in said pipe, and means responsive to the load on a car for controlling said last means to cause it to establish different ones of said fixed ratios between the brake cylinder pressure and the pressure in said pipe.

15. In a vehicle brake equipment, in combination, a brake cylinder, a normally uncharged pipe chargeable with fluid at different pressures, means including a plurality of electroresponsive means effective upon the charging of the said pipe to a given pressure to cause one of a plurality of different pressures to be established in the brake cylinder dependent upon which of the said plurality of electroresponsive means is energized or deenergized, and means controlled according to the load on the vehicle for selectively controlling the energization of said electroresponsive means.

16. In a variable load brake equipment for a vehicle or train, in combination, a brake cylinder, a normally uncharged pipe chargeable with fluid at different pressures, means including a plurality of electroresponsive means effective upon the charging of said pipe to a given pressure to cause one of a plurality of different pressures to be established in the brake cylinder dependent upon which of the said plurality of electroresponsive means is energized or deenergized, means for supplying a voltage in accordance with the load on a vehicle, and a plurality of voltage-responsive relays responsive to different voltages respectively and controlled according to the voltage supplied by said last means for selectively controlling the said electroresponsive means.

17. In a variable load brake equipment for a vehicle or train, in combination, a brake cylinder, a normally uncharged pipe chargeable with fluid at different pressures, means including a plurality of electroresponsive means effective upon the charging of said pipe to a given pressure to cause one of a plurality of different pressures to be established in the brake cylinder dependent upon which of the said plurality of electroresponsive means is energized or deenergized, means for supplying a voltage in accordance with the load on a vehicle, and a plurality of voltage-responsive relays responsive to different voltages respectively and controlled according to the voltage supplied by said last means for selectively controlling the said electroresponsive means, and means for delaying operative response of said relays for preventing undesired energization or deenergization of said electroresponsive means upon a rapid unsustained variation in the voltage as supplied from the said voltage supply means.

18. In a variable load brake equipment for a vehicle or train, in combination, a brake cylinder, a normally uncharged pipe chargeable with fluid at different pressures, means including a plurality of electroresponsive means effective upon the charging of said pipe to a given pressure to cause one of a plurality of different pressures to be established in the brake cylinder dependent upon which of the said plurality of electroresponsive means are energized or deenergized, voltage translating means including a primary coil and a secondary coil, means responsive to the load on the vehicle for causing the voltage induced in the secondary coil to vary in accordance with the load on the vehicle, and a plurality of separate means responsive to different voltages, respectively, as supplied from the said secondary coil for selectively controlling energization of the said electroresponsive means.

19. In a vehicle brake equipment, in combination, a primary coil, a secondary coil inductively coupled to the primary coil and having a voltage induced therein upon energization of the primary coil, a source of direct current, a circuit including said primary coil and source of direct current, means for alternately closing and opening said circuit to cause energization of the primary coil by a pulsating direct current, magnetic core means associated with the primary and secondary coils and movable relative thereto in such manner as to cause the voltage induced in the secondary coil to correspond substantially to a variable operating condition of the vehicle, and electroresponsive means controlled in accordance with the voltage induced in the said secondary coil for controlling the degree of application of the brakes.

20. In a variable load brake equipment for a vehicle or train, in combination, a brake cylinder, a normally uncharged pipe chargeable with fluid at different pressures, means including a plurality of electroresponsive means effective upon the charging of said pipe to a given pressure to cause one of a plurality of different pressures to be established in the brake cylinder dependent upon which of the said plurality of electroresponsive means is energized or deenergized, means for supplying a voltage in accordance with a variable operating condition of the vehicle, and a plurality of voltage-responsive relays responsive to different voltages respectively and controlled according to the voltage supplied by said last means for selectively controlling the said electroresponsive means.

21. In a variable load brake equipment for a vehicle or train, in combination, a brake cylinder, a normally uncharged pipe chargeable with fluid at different pressures, means including a plurality of electroresponsive means effective upon the charging of said pipe to a given pressure to cause one of a plurality of different pressures to be established in the brake cylinder dependent upon which of the said plurality of electroresponsive means is energized or deenergized, means for supplying a voltage in accordance with a variable operating condition of the vehicle, a plurality of voltage-responsive relays responsive to different voltages respectively and controlled according to the voltage supplied by said last means for selectively controlling the said electroresponsive means, and means for delaying operative response of said relays for preventing undesired energization or deenergization of said electroresponsive means upon a rapid unsustained variation in the voltage as supplied from the said voltage supply means.

JOHN CANETTA.
JOHN B. GROSSWEGE.